Figure 1:
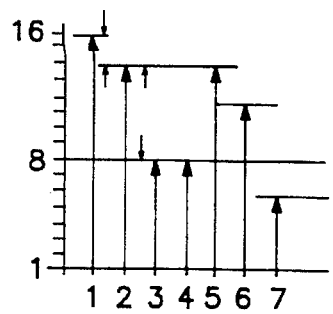
Figure 3A:
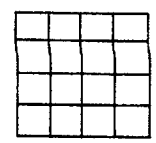
Figure 3C:
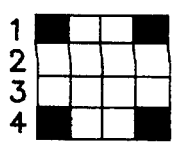
Figure 3B:
Figure 3D:

United States Patent [19]
Dirr

[11] Patent Number: 5,587,797
[45] Date of Patent: Dec. 24, 1996

[54] PROCESS FOR ENCODING AND TRANSMITTING INFORMATION

[76] Inventor: Josef Dirr, Neufahrner Str. 5, D81679 Munich, Germany

[21] Appl. No.: 50,402
[22] PCT Filed: Nov. 5, 1993
[86] PCT No.: PCT/EP93/03088
§ 371 Date: Jun. 24, 1994
§ 102(e) Date: Jun. 24, 1994
[87] PCT Pub. No.: WO94/00973
PCT Pub. Date: Jan. 20, 1994

[30] Foreign Application Priority Data

Nov. 6, 1992 [DE] Germany ............... 42 37 547.9
Dec. 23, 1992 [DE] Germany ............... 42 43 899.3
Aug. 11, 1993 [DE] Germany ............... 43 26 997.4

[51] Int. Cl.⁶ .................. H04N 1/419; G08C 19/12
[52] U.S. Cl. .................. 358/261.1; 358/261.2; 358/262.1; 341/109; 341/178; 341/179
[58] Field of Search .................. 358/261.1, 426, 358/427, 261.2, 261.3, 429, 262.1; 395/109, 114; 341/3, 9, 30, 56, 82, 85, 88, 173, 81; 375/286, 287; H04N 1/419

[56] References Cited

U.S. PATENT DOCUMENTS

| Re. 32,291 | 11/1986 | Nakagome | 358/261.3 |
| 4,086,430 | 4/1978 | Brown | 178/88 |
| 4,121,259 | 10/1978 | Preuss et al. | 358/261 |
| 4,353,095 | 10/1982 | Tatematsu et al. | 358/260 |
| 4,420,771 | 12/1983 | Pirsch | 358/261 |
| 4,464,767 | 8/1984 | Bremer | 375/67 |

(List continued on next page.)

FOREIGN PATENT DOCUMENTS

| 4025026 | 6/1991 | Germany . |
| 4028927 | 3/1992 | Germany . |
| 9004895 | 5/1990 | WIPO . |
| 9304572 | 3/1993 | WIPO . |

OTHER PUBLICATIONS

Patent Abstracts of Japan vol. 016, No. 146 (E-1188) 10 Apr. 1992 & JP,A,40 003579 (Ricoh Co Ltd) 8 Jan. 1992.
IEEE Transactions on Consumer Electronics, bd. 34, Nr. 3, Aug. 1988, New York US pp. 759-767.
Signal Processing Image Communication, Bd. 1, Nr. 1, Jun. 1989, Amsterdam NL, pp. 55-73.
Conference Record of the National Telesystems Conference-–Galveston, TX, USA-7-10 Nov. 1982, p. E1.5.1
Journal of the Society of Motion Picture and Television Engineers, Bd. 82, Nr. 8, Aug. 1973, pp. 649-654.

(List continued on next page.)

*Primary Examiner*—Scott A. Rogers
*Assistant Examiner*—Madeleine Anh-Vinh Nguyen
*Attorney, Agent, or Firm*—Nields & Lemack

[57] ABSTRACT

The present invention relates to process for encoding and transmitting information wherein data, digitalized speech, image, or documents, optionally in colour, are encoded by multilevel combination code with multilevel code elements into a signal, in particular represented by period duration of said signal and/or by a different number of periods in connection with amplitude levels of said signal whereby an amplitude level is used as redundance or quasi level for an identification of code combinations. In the case of digital encoding of the information of a sequence of similar code elements, similar code words, similar lines with associated code words in the sequence are combined in such a way that the number of the sequences are provided in code. The processes may be adapted in such way that the half tones of telefax on the transmitting side are either directly provided with a quantification value of the half tones, preferably according to the run length principle, and thereafter transmitted in a multilevel code, and that, at the receiving end, means are foreseen that after decoding convert the signal into pixels according to a dither process. By using these kinds of processes, transmission times are shortened and bandwidths are reduced.

11 Claims, 3 Drawing Sheets

U.S. PATENT DOCUMENTS

| | | | |
|---|---|---|---|
| 4,534,040 | 8/1985 | Thapar | 375/39 |
| 4,571,549 | 2/1986 | Lods et al. | 332/103 |
| 4,675,721 | 6/1987 | Dirr | 358/13 |
| 4,731,798 | 3/1988 | Dirr | 375/38 |
| 4,794,621 | 12/1988 | Dirr | 375/52 |
| 4,800,441 | 1/1989 | Sato | 358/261.1 |
| 4,947,483 | 8/1990 | Dirr | 370/30 |
| 5,050,188 | 9/1991 | Dirr | 375/38 |
| 5,323,247 | 6/1994 | Parker et al. | 358/457 |

OTHER PUBLICATIONS

IEEE Transactions on Commuications, vol. 36, No. 3, Mar. 1988; TAT (Time–Asix Transform) Bandwidth Compression System of Picture Signals; Masayuki Tanimoto, et al.

Digital APK Modulation Systems with Arbitrarily Even and Odd Numbers of Steps Part I: $m=^n$–ary APK–Systems (n=1,2 . . . ); Von Anton Vlcek and Hermann Weidenfeller.

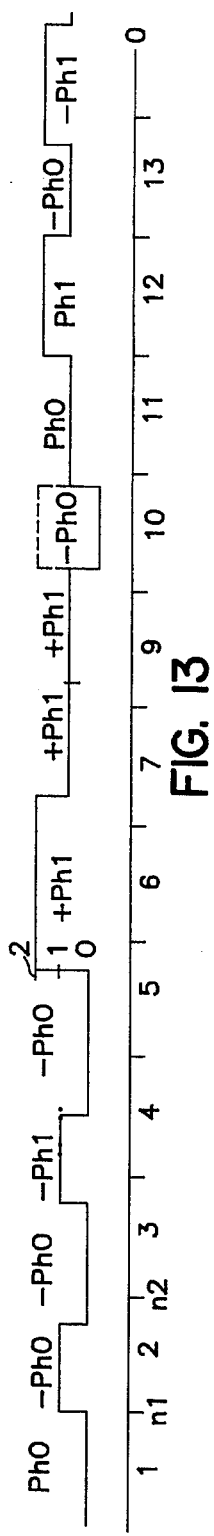
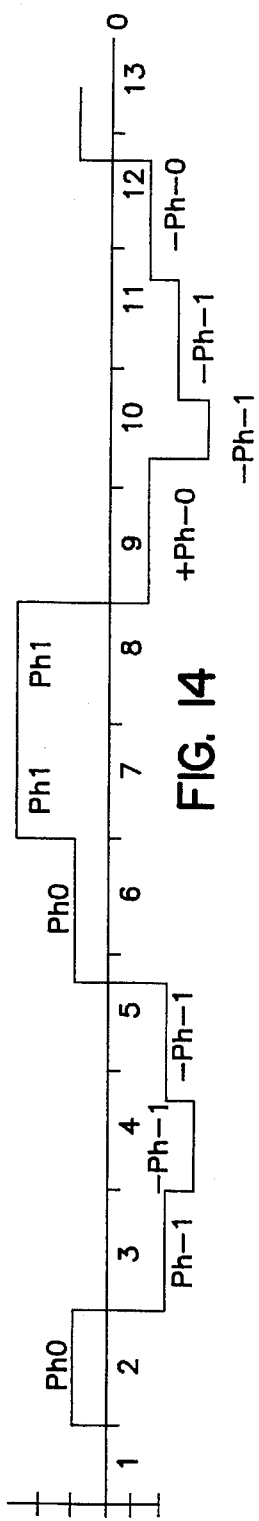
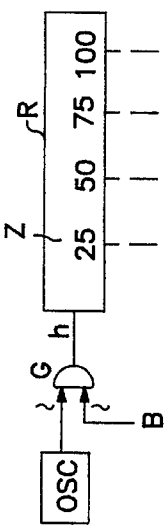
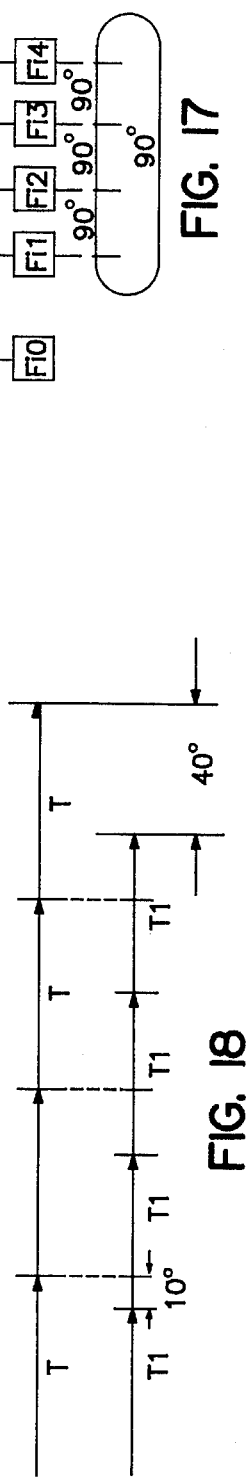

PROCESS FOR ENCODING AND TRANSMITTING INFORMATION

TECHNICAL FIELD

The present invention concerns a process for encoding and transmitting information, for instance text, images, data and speech. The examples given concern mainly telefax and colour television.

STATE OF THE ART

For telefax it should also be possible to encode and transmit photographs and documents with different levels of grey. For this a range of values scanned for the pixels (picture elements) are distributed for example into 16 levels and encoded according to the dither principle into 16 black/white pixels arranged in squares. In this 16 white pixels correspond to the grey value 1 and 16 black pixels to the grey value 16. For each grey value, thus also voltage value, the pixels are distributed in more or less dense samples of white and black pixels. For the eye this appears always as light or dark grey tones. The transmission of these squares takes time and is not simple. A transmission through current is then often made with the help of a phase difference or amplitude/phase difference modulation.

Colour photographs and pictures, also those from the still-video system from Canon are often encoded and transmitted as with colour television e.g. PAL. In the NTSC system this leads to significant colour faults, which can only be corrected with much effort in the PAL system. Furthermore, in all the systems there are faults known as cross luminance and cross colour. This type of coding and transmission also requires delay elements to adapt the transit times.

SUMMARY OF THE INVENTION

The objective of the invention is to create such a coding and transmission of the information in which the transmission time is shortened, and/or the bandwidth is reduced. For the transmission of colours the known faults must be avoided. This is achieved for example in grey telefax transmission in that the conversion according to the dither process is only made at the receiver end. Furthermore, for instance in run length coding, the same code words of similar lines, e.g. only one code word for white, are combined with the same or with different synchronously placed code words in a sequence. This is carried out as follows, that before or after the multiple code word or line the number of repeated code words or lines is indicated. The same can of course be carried out on the coding of speech, colour or others. The colours may be also coded in appropriate manner by means of chromatic components and transmitted for example on a QAM basis. The chromatic components can be transmitted for example per image one after the other or the corresponding position values or CPM values can be exchanged on 2 coding sequences for transmission. In this case it is an advantage to make a code multiplexing of several information channels. A combination code of phase shifted in leading phase position, trailing phase position, identical phase position (as a reference phase position) and optionally a code made of a different number of periods linked with an amplitude code is especially effective. The amplitude level is thereby foreseen as redundant or quasi-level for the unambiguous identification of definite code combinations.

The combination code of the phase, number of periods and amplitudes can only be made with an alternating current. The phase position is determined and by the duration of the sums of the alternating current period durations. The number or frequency of the alternating current periods is such that it is an even numbered multiple of the duration of the phase position. The amplitudes of the periods are then the amplitude levels.

SHORT DESCRIPTION OF THE FIGURES

FIG. 1, 2—Coding of grey tones in telefax

FIG. 3—Principle of the dither process

Figure 4:
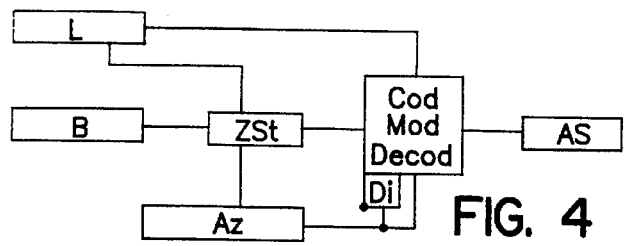

FIG. 4—Basic circuit diagram of a telefax apparatus

Figure 5:
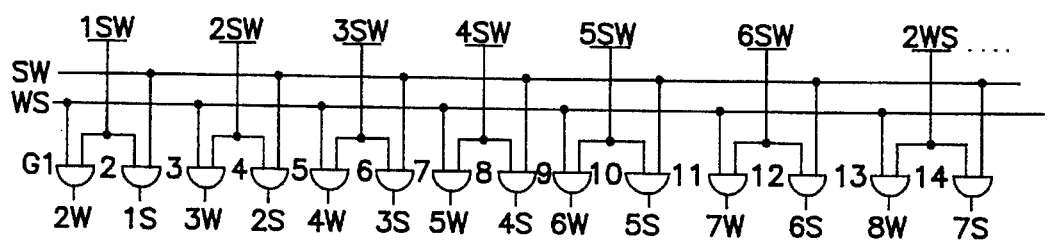

FIG. 5, 6—Use of a run length code for white and black

FIG. 7—Quadrature modulated transmission of step signals on 2 channels

Figure 8:
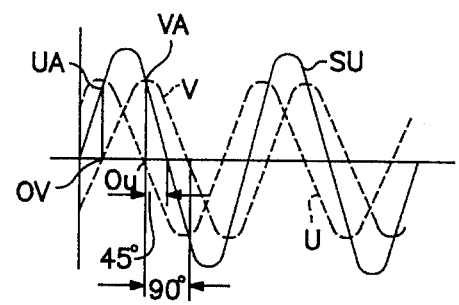

FIG. 8, 12—Quadrature amplitude modulation with vector diagram

Figure 9:
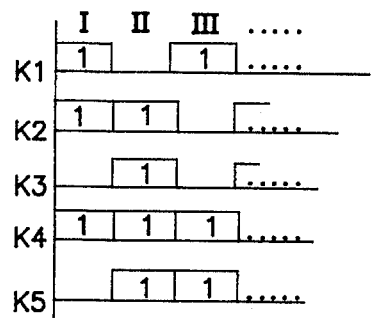

FIG. 9—Code multiplex combination of channels

Figure 10:
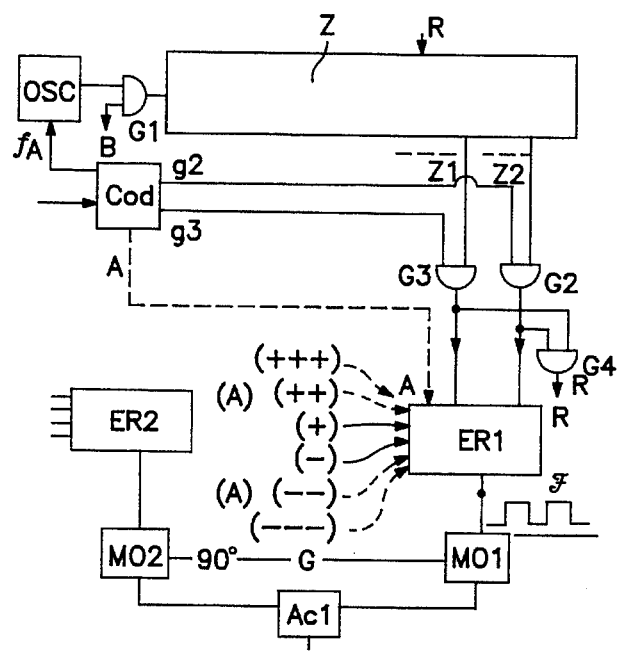

FIG. 10—Basic circuit diagram for the generation of phase/amplitude levels

Figure 11:
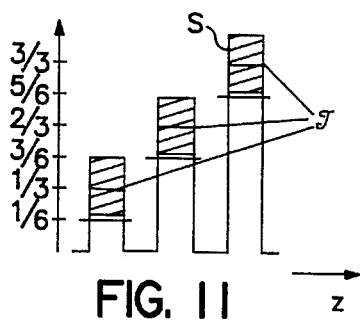

FIG. 11—Representation of a dual binary amplitude code

FIG. 13, 14—A unipolar and bipolar phase/amplitude code

FIG. 15—A code for the quadrature modulated transmission with the transient zones FIG. 16—A phase/number of period code FIG. 17—Basic circuit diagram for generation of phase shifted alternating currents FIG. 18—Representation of a phase shift step by the summation of small phase steps

WAYS AND MEANS TO CARRY OUT THE INVENTION

First an example will be given for the coding of grey pictures and transmission for 16 corresponding grey scale levels with the aim of processing by the dither process. Thereby the main difference compared with previous methods is that the conversion of the quantity levels into pixels is made with a dither process not made at the transmitter, but only at the receiver end. The transmission of the image information can, in this way, be efficiently carried out. The grey tone pixels can be transmitted in either analog or digital form to the receiver. It is possible to immediately transmit the PAM value or the corresponding digital value in an analog way, in that quantification levels corresponding to grey scales are transmitted in an analog way in function of their value. The PAM values in this case are transferred onto the amplitudes of half waves or periods of an alternating current and transmitted immediately as a coding alternating current or by means of a carrier to the receiving end. Such codings are for example contained in my U.S. Pat. No. 4,731,798. With digital coding it is possible to foresee the same run length coding as with the white/black transmission, or it is possible also to foresee a binary code whereby the latter are transformed for transmission into multilevel codes. With the transmission of coded alternating currents one can also additionally use QAM, so that much more information can be transmitted. It is in this way also possible to contrive a frequency division. One can also foresee the double QAM i.e. when the sum alternating currents are again added. It is also possible to transmit the coded or addition alternating currents in frequency modulation, because this is a narrow band. The quantification levels 1 to 16, 1 is allocated to white and 16 to black, in run length coding the shortest numbers from white to black are always allocated. One can obviously use in all cases all known MHC, MCR and MMR processes. It is possible to obtain a further reduction of the transmission time if the same levels in the sequence are combined in such a way that one gives before or after the level coding the number of the following levels, e.g. 13, 13, 13, 13=13/4. These sequential numbers receive a special code. The slash/is of course not transmitted. One can do the same with equal lines. Thereby, for example, a code word must be given at the beginning of the line "same lines" and before or after the number of identical lines indicated, also identified by a special code word. A further reduction in the transmission time can be obtained if 16 stages are divided into sub-levels, e.g. in 2×8 levels.

One must then foresee for a pixel line 2 quantification lines 8 to 1 and 8 to 16, whereby a storage must be first provided. In this case one can use also a sequence with the code words or with the quantification lines. It is also possible, for instance, with run length coding, to use the same code words for the levels 8 to 1 and 8 to 16. A code word is necessary at the beginning of each quantification line, which always marks lines 8 to 1 and 9 to 16. Identical lines must not always show the same levels, but it is sufficient that the same levels be synchronous. If this provides advantages, it is also possible to make the quantification lines modifiable, e.g. 7 to 0 and 8 to 16. This must be transmitted to the receiver by a code word. An example is shown in FIG. 1. For the acquisition 1 to 6, the quantification levels reach 8 and exceed 8. In consequence, with the line 8 to 1 one must use the level 8/6 coding. The acquisition 7 would have the level 2 of 8 calculated. In transmission both quantification lines need not been transmitted together synchronously. At the receiver side, in the memory or firstly for instance in the conversion, the quantification lines are combined into a dither signal.

Figure 2:
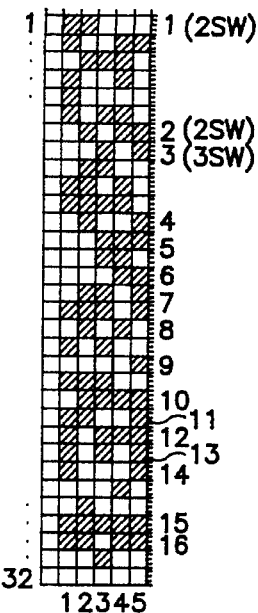

It is also possible to represent the 16 quantification levels as a binary code with 2 at the power 4 code elements. Any sample has then the same position number. For the transmission, one must provide multi-level coding. To shorten the transmission time, one can again use the sequence principle for identical code words foreseen in a very effective way by bringing in redundancy in code word in, e.g. when one foresees for 16 levels 2 at the power 5 combinations. FIG. 2 shows such an example. If the code word is again divided into 2 groups, and the groups 123 and 45, one sees that the 45 group shows only 2 different values for all 16 levels. Obviously one will allocate such code words for levels that come frequently, so that they always contain the same code element 45. For an image line one requires again 2 coding lines. With the coding line 123 several code words can always be combined into the 3 code elements.

FIG. 3 shows the principle of the conversion of the grey tones into pixels by the dither process. The white surface of FIG. 3a corresponds then to the grey value 1, the black surface of FIG. 3b to level 16. With the lower grey value of FIG. 3c there are fewer black pixels per unit area and with a high grey level, e.g. FIG. 3d more black pixels are foreseen presented to the viewer. FIG. 4 shows the diagram of a telefax unit. The reading unit L has the task of converting the document to be transferred into analog electric signals. In normal black/white transmission, reading unit L is directly connected to a coding unit. With this the white and black pixels are summed and converted into a code, e.g. MHC code. The information is given to the transmission and through the switching unit AS to the modem Mod which has converted this information into a multilevel code. The control is made via the control panel B.

In the grey scanning the information for each pixel is quantified in the coding unit, i.e. each pixel is assigned a value of the grey scale, and, depending on the resolution, distributed into 16 or 64 levels. These levels used to be distributed and transmitted in the coding unit in a preset number of white and black pixels, as shown in FIG. 3. In the invention, on the contrary, the levels are converted into run lengths, thus 1, 2 . . . 16 or into a binary code or directly into a multilevel code and transferred immediately or later though the modem. The incoming information passes through the switching-in unit as and modem Mod to the decoder. Decod, where the modem Mod and the decoder Decod are included together with a coding unit Cod in the box labelled "Cod Mod Decod". Before transmitting the information, an identification and a choice of the instrument functions are carried out. The procedures will not be described in more detail. In particular these procedures are stored in the central control unit ZSt which controls the information processing. With the present invention, at the time of the grey reception, the decoded information is transferred to the converter for the dither process Di and from there to the recording unit.

Figure 6:
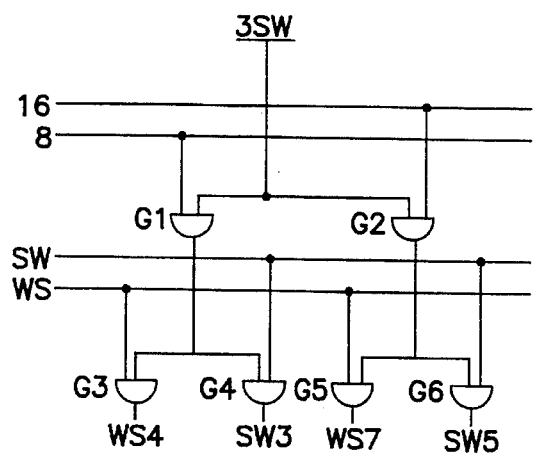

It is possible to transmit black/white as well as grey documents with a sheet with the corresponding markings, for example with a graphite/magnetic pen. When this mark is reached and before starting the next lines, a special criterion is transmitted so that the unit switches to black/white. In the preceding case, both the white and the black run lengths are foreseen with the same code words. This is possible because the run length principle defines that after a white run length there is always a black run length and each line starts with a white run length or a white code word. In the allocation of the code words one must also take into account, the frequency of occurrence. 2 black (=two black run lengths) is coded with "1" "1", with white one can for example allocate the number 3 to the code word "1" "1". When switching to another resolution, a new allocation can be made. FIGS. 5 and 6 represent allocation examples.

The evaluated code words 1sw to 6sw, 2ws, etc. are represented in FIG. 5. If the evaluation 1sw and the sequence is ws, gate G1 is activated and thus 2w marked. If the sequence is sw, gate G2 is activated and thus 1s is marked. If the evaluation is 2ws, then either 8w or 7s is marked in function of the sequence.

FIG. 6 adds to FIG. 5 a representation of the function of the resolution. With a resolution of 8, a sequence ws and an evaluation of 3sw, gates G1 and G3 are activated and ws4 is marked. However, for a resolution of 16, gates G2 and G5 would be activated and thus marked with 3sw, ws7. The frequency of occurrence changes for another resolution.

Images and documents in colour can be taken up with cameras or also according to the CIS system through changes of filters in the transmission colours red, green and blue. The present invention concerns the processing of the analog values of the colour extracts. The colour television systems NTSC, SECAM and PAL are well known. In the case of telefax it is adequate to transmit the colour extract as 3 grey images in the form of red extracts, green extracts and blue extracts. With a colour receiver the received values which are exchanged cyclically by the transmitter are immediately transferred to the corresponding deflection devices.

For colour reproduction it is more adequate to transmit the 3 grey extracts of a document or image one after the other. For analog transmission the extracts are converted into a unipolar PAM and transferred thereafter onto the amplitudes of 2 coded alternating currents, phase shifted by 90°, which are added for the transmission. This sum alternating current can be transmitted as such or by means of a carrier. In the case of digital encoding it is adequate to convert the respective information first to a binary code, for example as in FIG. 2, and to transmit this coded information with a multilevel, for instance a phase/amplitude code.

In the case of a black/white transmission, obviously only white or black lines will be combined. One would as already described place before or after the code word for white 1728 the coded number of white lines. In the case of typewritten pages with a distance of 4 mm, the resolution of 8, there would be between the written lines 32 white lines. This gives a significant saving in time. The PCT-application WO 93/04572 also contains similar information with the same priority as the present application. It was already published on 18.03.93.

FIG. 13 shows a unipolar phase/amplitude code. It consists of 3 phase levels Ph, −Ph, +ph and 2 amplitude levels 0,1. The 3rd amplitude level is not an active level, but a redundant level to mark a phase state change. 1–13 are the clock signals, their separation corresponds to the normal period duration or phase Ph, the latter is indicated by 'n'. The period duration of −Ph is 3 units and that of +Ph 5 units, the normal phase (=reference phase) being defined to have a period duration of 4 units. The code is represented in the shape of step signals. The coding starts in the example with PH0, i.e. normal phase AMPlitude 0. The following coding is −Ph0, amplitude 0, because there is no indication for the phase change, an amplitude change must indicate this phase change, so in a sense the redundance stage is used. This change is marked by the amplitude level 1. If for instance the amplitude level 1 is foreseen at the same time, then this should be indicated by a variation of 2 steps of the amplitude level. As −Ph is marked by 3 units, this must also be marked, i.e. depending if the following code element has the amplitude level 0 or 1, the amplitude level 0 or 2 is switched. In the example the subsequent code element has the same phase −Ph in the same amplitude value 0. When the normal period duration is maintained at 4 units, this means that the phase shift of −Ph remains valid. The next code element has the phase −Ph and the amplitude 1, thus −Ph1, i.e. the amplitude change is from 0 to 1 and as the phase does not change, the period duration is again 4 units. With the next code element only the amplitude level changes from 1 to 0 and the phase remains the same. With the subsequent code element the phase changes from −Ph to +Ph and the amplitude from 0 to 1. This is indicated by 2 amplitude levels and by 6 units and thus +1 unit to reach the normal phase and one unit to reach the + phase. If one increased only one amplitude level, this would indicate only the amplitude stage 0. As the following two code elements retain the +Ph and the amplitude level 1, after the 6 units only 1 amplitude change to 1 necessary. The next code element is −Ph0. −Ph is separated from the +Ph phase by 2 units, the change thus can only have 2 units. In this case the amplitude level change to 0 indicates simultaneously also the phase change. With an amplitude change to 1, the dotted line is applicable. The next code element is Ph0, i.e. it must be 5 units long. There is no change in the amplitude. In case of a change in amplitude to 1, the amplitude level 2 should be switched on. This is the case in the next code element Ph1. At the receiver end, the units n must of course be synchronized with the transmitter. As pulses one can of course also use alternating current pulses. The generation of these step signals will be explained in the description of FIG. 10.

What are the possible combinations with the code of FIG. 13?. There are 2 acceptable amplitude levels and 3 phase levels available for each code element, resulting in a basis of 2+3=5 stages. With 2 positions there are 5 at the power 2=25 combinations, with 3 positions 5 at the power 3=125 combinations, etc. It is now possible to foresee 2 such channels for coding and to modulate these on 2 carriers of the same frequency but phase shifted by 90°. The two carriers are then added for transmission. For processing at the receiver end a reference phase, like the burst in colour television, is necessary. The result is then a basis of 2×(2+3)=10. The principle of this QAM transmission and a vector diagram are given in FIG. 8 and FIG. 12 which will be described later. The method of the patent DE 2938776 can also be extended by this invention. In this patent the signs are made up of a preset code combination made up of two or more, single or multiple identification sections which can be arranged in series and/or in parallel. The coding is made by the number of identification sections, by the code elements that they contain (steps) and by the local position of the identification section.

Figure 7A:
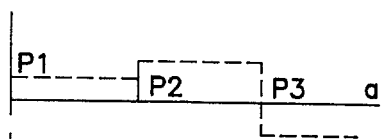
Figure 7B:
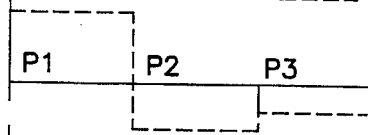
Figure 7C:
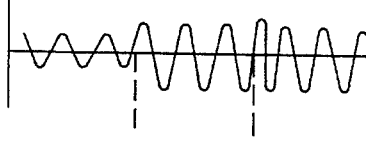
Figure 7D:
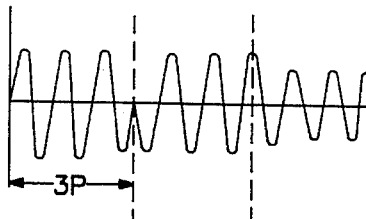
Figure 7E:
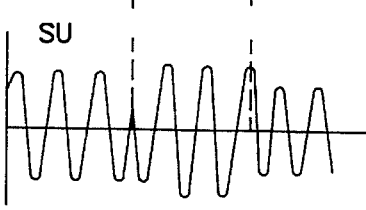

FIG. 14 shows a bipolar arrangement of the step signals, such that the number of levels is significantly increased. The amplitude levels are then described by 0/−0, 1/−1. However, the QAM transmission of 2 such channels can show phase shifts of over 300°. A method enabling to compensate largely the phase errors is represented in FIG. 7. FIG. 7a and 7b show 2 step pulse sequences P1, P2, P3 . . . that modulate the carrier alternating currents of FIG. 7c and 7d. Thereafter both carriers are summed (FIG. 7e). An alternating current that shows the reference phase, as with the burst in colour television, allow the receiver to process the information in a standard known manner. The two carrier alternating currents at transmission are phase shifted by 90°. Preferably, an integral multiple of periods of the carrier are allocated to each step signal. The evaluation of the phase situation is made only at the last or one of the last periods of the sum alternating currents. In FIG. 7 the step signals have the same period duration, and the acquisition of the two signals is also synchronous. From FIG. 7d one sees that each time 3 periods correspond to the period duration of a step signal (3P). It is also possible to place the code elements so that there is time for the oscillation start of the sum alternating current to occur. This is indicated in FIG. 15a. In this example 4 units are allocated to a code element: 1, 2-2, 1-1, 2,1. In time 2 there is no change, so that this time is available for the start of oscillations. As in FIG. 13 code elements −Ph, Ph and +Ph are foreseen, i.e. phase shift corresponding to the period duration change −1 and +1. In FIG. 13 the smallest distance possible between changes is represented at distance 9. It is thus appropriate in QAM transmission to synchronize the clock signals 1–13, or n1 to n13 of both step signal sequences. If the carrier frequencies are a multiple of the clock frequency, there is always time between changes for transient effects. It is possible to further increase the number of steps by, for example, dividing the period durations (in the example of FIG. 13: −Ph, Ph, +Ph) in a preset number of pulses or periods, for example in FIG. 15b, J1−Jn, for one step there is for the period duration Ph5 pulses. Another level has for example 10 pulses. The generation can be made with a circuit as in FIG. 10. Furthermore, for example, more steps can be set up when a code element consists of 2 or more period durations, cf. units 2/3, 4/5 etc. in FIG. 13.

FIG. 16 represents the principle of yet another encoding method. In this case the steps are made up of a number of periods linked to phase steps and amplitude steps, whereby the principle of redundancy as in FIG. 13 is also foreseen. In this case the steps are 100 periods with normal phase, leading phase and trailing phase and with amplitude levels 0 and 1. The redundancy level is again used to identify a change of phase or period. The same applies for 50 and 75 periods. FIG. 18 shows the principle of the summing of small phase steps into a phase level. If, for example, the normal period duration T is reduced to a period duration T1, which represents for example 10°, then for 4 period durations there is a phase difference compared to the alternating current with the period T of 40°. On this basis one has for example the leading and trailing phase steps of FIG. 16. The evaluation at the receiver end is again made with a reference phase (e.g. burst).

When a code element is made up of 2 or more period durations, the levels can be construed from the serial position of the period durations. FIG. 17 shows the block diagram to generate phase shifted alternating currents, such as required for, for example, for QAM. All the outputs of a counting element z correspond to the time of a half or whole period of square pulses. If now with 100 outputs relays ER3 and ER4 are activated at the 75th and 100th outputs, then the distance of the pulse sequences generated in the ER relay is 90°. The frequency of these pulse sequences is determined by the control frequency for the counting element. The driving pulses are generated in the oscillator Osc and switched over the gate G at the beginning potential over B and to the counting element. In the example, further phase shifted alternating currents are generated at the outputs 25 and 50. The filters Fi1 to Fi4 convert the square pulses into a sine shape. By filtering out the harmonics thorough Fi0 one can generate alternating currents of still higher frequency.

FIG. 8 represents the principle of QAM, thus the addition of alternating currents of the same frequency. V and U are the two alternating currents phase shifted by 90°. One can see that at the zero crossing (0V) the U alternating current has the amplitude UA. And going through zero by U, the alternating current V has the amplitude value VA. This is used in a known manner for the evaluation on the receiving side with the help of a reference phase. The two alternating currents can then again be separated by measuring the amplitude. The sum alternating current SU has the same frequency as the alternating currents U and V.

FIG. 9 shows 5 binary coded channels. With the multilevel encoding, for example with 10 bit, one could encode the binary code elements I+II with a multilevel code element. One could also transmit from channel 1 10 sequential binary code elements with a multilevel 10 bit code element.

FIG. 11 represents a duobinary pulse code. The set size of the pulses is 1/3, 2/3 and 3/3. The size of the perturbations S is shown hatched. The real pulse size is then 1/6, 3/6 and 5/6. Also in wireless transmission, as can be seen from FIG. 11 the duobinary amplitude coding used in FIG. 13 should provide no difficulty.

Figure 12:
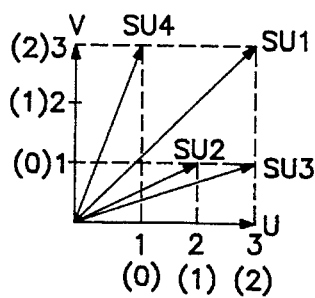

FIG. 12 represents the vector diagram for QAM, with which 2 unipolar pulse sequences are transmitted in compliance with FIG. 13. One sees that the phase shift of the sum alternating currents goes only from SU3 to SU4. The transient effects are in this case much smaller than when phase shifts occur up to 360°, as for instance with a bipolar phase-amplitude code as per FIG. 14.

FIG. 10 gives the circuit diagram for the generation of code elements as used in FIG. 13. The period durations linked with the encoder Cod are fixed in the counting element Z. The largest period duration comes on cycle 6. The output Z2 is foreseen for this. For simplicity, for the 6 units 60 outputs are used. The encoder Cod fixes always which output must be marked on the basis of the code. With 6 units, a potential is placed on g2, such that in common with the Z2 potential gate G2 becomes active. Thus the end of the 6 units is marked in the electronic relay ER1. The encoder, at the same time, gives through A an indication to ER1 at the start of the pulse, that the pulse contains 6 units of amplitude 2 (A) +++. In the example, 10 outputs are then allocated to the counting element. When several identical code elements come in sequence, the encoder indicates it immediately through A to ER1, so that no amplitude change is carried out. With 5 units, the encoder Cod over g3 activates gate G3, i.e. the step pulse is then changed. With the first control pulse at the counting element, after resetting, always made through gate 4 to R, the amplitude for the starting step pulse is marked in ER1 via A. In this way it is possible to control, over the outputs of the counting element, all period durations in combination with the encoder, whereas the control of the amplitude size is carried out directly by the encoder at the electronic relay ER1. The small pulses of FIG. 15b J1–Jn can be controlled by through the outputs in connection with the encoder. If 2 step pulse sequences per FIG. 13 must be transmitted, for example on the basis of QAM, this requires a 2nd switching with ER2. The step pulse sequences that appear at the output of the ER relays are then transferred to the modulators Mo1 and Mo2. There they receive the carrier alternating currents over the generator G, one phase shifted by 90°. On the modulator, both are entered into the adder element and to the transmission routes as sum alternating currents.

As the example of FIG. 13 shows the combination code with only one alternating current for the levels of phase, the number of periods and the amplitudes. In FIG. 13 the levels "number of periods" will be added which can be different for each phase situation. In FIG. 13, 2, 3, 4, 5 and 6 units appear. If one chooses different frequencies for "the number of periods", one could then for FIG. 13 choose for example with 2 frequencies per unit one time 4 periods and one time 6 periods. 2, 3, 4, 5 and 6 units result in 8, 12, 16, 20 and 24 periods, respectively, and in the case of 6 periods per unit 12, 18, 24, 30, 36 periods, respectively. So, for example, +Ph1 over cycle 6 would be represented once with 24 and once with 36 periods of definite amplitudes. The period duration and the number of periods can be measured. This is sufficient to analyze the levels.

The generation of these periods can be made on the basis of FIG. 10. It is possible to foresee also means in the transmitter that can provide a run length encoding for groups 3 and 4 as well as one for which the same code words are foreseen for white and black. It is also possible to allocate different numbers to the code words, because the frequency of occurrence is different for white and black. At the receiver end one must provide means that switch the evaluation means so that the run length marks from the transmitter are marked.

I claim:

1. Method for coding and transmitting information comprising:

generating a multilevel phase coding by providing an alternating current of constant frequency and constant phase and providing pulses of predetermined length as code elements, represented by half-periods or periods of said alternating current of said frequency, which pulses are transmitted in an uninterrupted series, a change of phase of said pulses being obtained by increasing or decreasing the numbers of half-periods or periods in relation to the number of half-periods or periods of the preceding pulse, or providing the difference phase as code element, for which the preceding code element is used as a reference, wherein also a leading or lagging phase in relation to the reference phase or in relation to the preceding impulse phase is used as level criterion and a change of phase level which cannot be distinguished is marked by a change of the amplitude of said alternating current.

2. Method for coding and transmitting information, comprising:

generating a multilevel coding, having several levels, by providing an alternating current of constant frequency and constant phase, wherein the several levels are represented by different numbers of half-periods or periods which are transmitted in an uninterrupted series, wherein a reference level or a difference level with respect to the preceding level is provided by increasing or decreasing the number of periods or half-periods, whereby a change of level which is not distinguishable is marked by a change of amplitude.

3. Method according to claim 1, wherein two alternating currents of equal frequency are provided for the phase coding, which are dephased by 90° with respect to each other and which are added together for the transmission.

4. Method according to claim 2, wherein two alternating currents of equal frequency are provided for the phase coding, which are dephased by 90° with respect to each other and which are added together for the transmission.

5. Method according to claim 1, wherein plural identical code words occurring successively are collected together such that before or behind the code word the number of successively occurring equal code words is provided in an encoded manner.

6. Method according to claim 2, wherein plural identical code words occurring successively are collected together such that before or behind the code word the number of successively occurring equal code words is provided in an encoded manner.

7. Method according to claim 1 wherein in addition to the phase levels (numbers of period levels) there are provided amplitude levels and a redundancy amplitude level, having the purpose of marking changes of phase levels which are not distinguishable, which marks directly (FIG. 1, nl–Ph0/–Ph0) or indirectly the change of the signalling level by the sum (FIG. 1, 5/6, –Ph0/+Ph1) or by the difference of amplitude levels by including the redundancy amplitude levels.

8. Method according to claim 2 wherein in addition to the phase levels (numbers of period levels) there are provided amplitude levels and a redundancy amplitude level, having the purpose of marking changes of phase levels which are not distinguishable, which marks directly (FIG. 1, nl–Ph0/–Ph0) or indirectly the change of the signalling level by the sum (FIG. 1, 5/6, –Ph0/+Ph1) or by the difference of amplitude levels by including the redundancy amplitude levels.

9. Method according to claim 1, wherein the transmitting alternating current is provided simultaneously as coding alternating current.

10. Method according to claim 2, wherein the transmitting alternating current is provided simultaneously as coding alternating current.

11. A process for multilevel encoding of information, characterized in that the encoding of information by a multilevel combination-code is carried out in such a manner that upon unclear changes of level-criteria an additional redundancy-amplitude level is provided as a criterion for code-condition changes in a manner wherein said redundancy-amplitude level marks the code-condition change directly and indirectly by means of the sum or difference of amplitude levels in relation to the redundancy-amplitude level.

* * * * *